United States Patent
Naitou et al.

(10) Patent No.: US 9,441,093 B2
(45) Date of Patent: Sep. 13, 2016

(54) ACRYLIC RUBBER COMPOSITION, AND CROSSLINKED PRODUCT THEREOF

(75) Inventors: Masatsugu Naitou, Sakai (JP); Yoshihiro Morooka, Sakai (JP); Koji Takeda, Sakai (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/391,511

(22) PCT Filed: Apr. 12, 2012

(86) PCT No.: PCT/JP2012/059988
§ 371 (c)(1),
(2), (4) Date: Oct. 9, 2014

(87) PCT Pub. No.: WO2013/153649
PCT Pub. Date: Oct. 17, 2013

(65) Prior Publication Data
US 2015/0073074 A1    Mar. 12, 2015

(51) Int. Cl.
C08L 33/10    (2006.01)
C08K 5/09     (2006.01)
C08F 220/18   (2006.01)
C08K 5/18     (2006.01)

(52) U.S. Cl.
CPC .............. C08K 5/18 (2013.01); C08F 220/18 (2013.01); C08K 5/09 (2013.01); C08L 33/10 (2013.01)

(58) Field of Classification Search
CPC ........... C08K 5/18; C08K 5/09; C08L 33/10; C08F 220/18
USPC ................................ 524/186, 556
See application file for complete search history.

(56) References Cited

U.S. PATENT DOCUMENTS

| | | | |
|---|---|---|---|
| 5,744,562 A * | 4/1998 | Saito | C08F 212/14 526/279 |
| 2004/0162380 A1 | 8/2004 | Kojima et al. | |
| 2007/0083000 A1 | 4/2007 | Kojima et al. | |

FOREIGN PATENT DOCUMENTS

| | | | | |
|---|---|---|---|---|
| EP | 0358195 A2 | 3/1990 | | |
| EP | 0755952 A2 | 1/1997 | | |
| JP | EP 0358195 A2 * | 3/1990 | ............ | C08F 259/08 |
| JP | 7-286081 A | 10/1995 | | |
| JP | 7-286083 A | 10/1995 | | |
| JP | 07286083 A * | 10/1995 | | |
| JP | EP 0755952 A2 * | 1/1997 | ............ | C08F 212/14 |
| JP | 9-278943 A | 10/1997 | | |
| JP | 2004-250520 A | 9/2004 | | |
| JP | 2004250520 A * | 9/2004 | | |
| JP | 2007-56068 A | 3/2007 | | |
| JP | 3058555 | 7/2007 | | |

OTHER PUBLICATIONS

International Preliminary Report on Patentability dated Oct. 23, 2014 for PCT Application No. PCT/JP2012/059988, filed Apr. 12, 2012.
International Search Report mailed Jul. 10, 2012 for PCT Application No. PCT/JP2012/059988, filed Apr. 12, 2012.
Supplementary Search Report dated Oct. 28, 2015 for EP Application No. 12874328.3, filed Apr. 12, 2012.

* cited by examiner

*Primary Examiner* — Michael M Bernshteyn
(74) *Attorney, Agent, or Firm* — Knobbe, Martens, Olson & Bear, LLP

(57) ABSTRACT

Provided is an acrylic rubber composition having further improved compression set resistance and comprising, based on 100 parts by mass of (a1) an acrylic rubber obtained by copolymerizing 0.1 to 10% by mass of a crosslinkable group-containing monomer, (a2) 0.4 to 50.0% by mass of a liquid fluororubber, and the crosslinked product thereof.

6 Claims, No Drawings

ACRYLIC RUBBER COMPOSITION, AND CROSSLINKED PRODUCT THEREOF

CROSS REFERENCE TO RELATED APPLICATIONS

This application is a U.S. National Phase Application of PCT International Application No. PCT/JP2012/059988, filed on Apr. 12, 2012, that designates the United States of America. The disclosure of the above-referenced application is hereby expressly incorporated by reference in its entirety.

TECHNICAL FIELD

The present invention relates to an acrylic rubber composition having excellent compression set resistance and heat resistance, and also relates to a crosslinked product thereof. In particular, the present invention relates to an acrylic rubber composition used for automotive rubber components such as gaskets, hoses, O-rings, seals where heat resistance and/or oil resistance is required, and the present invention further relates to a crosslinked product thereof.

BACKGROUND ART

An acrylic rubber is a rubber material which is excellent in heat resistance, oil resistance, weather resistance and the like. An acrylic rubber is therefore widely used for automotive rubber components such as gaskets, hoses, O-rings, seals. These days, the requirements for the properties of rubber components such as heat resistance, oil resistance and long lasting property have been increased due to higher-grade automobiles or automobiles having improved performance, and a crosslinkable blend material of a fluororubber and an acrylic rubber which is further excellent in heat resistance, oil resistance, long lasting property and the like has been developed.

However, in a crosslinkable blend material where both or either of the two rubber components of an acrylic rubber and a fluororubber are crosslinked, it is difficult to stably disperse the both rubber components of the acrylic rubber and the fluororubber for a long time. This causes a problem that the properties such as mechanical strength are degraded over time. In order to solve this problem, the applicant of the instant application proposes a vulcanizable acrylic rubber-fluororubber composition comprising: (A) a rubber component comprising a mixture of an acrylic rubber comprising 1 to 20 mol % of a crosslinkable group-containing polymer unit having crosslinkable hydroxyl groups or crosslinkable chlorine atoms, and a fluororubber which is a propylene hexafluoride homopolymer or a copolymer of propylene hexafluoride and vinylidene fluoride and/or ethylene tetrafluoride, wherein the weight ratio of the acrylic rubber to the fluororubber is 0.5 to 99.5/99.5 to 0.5; (B) an acid acceptor comprising a metal oxide and/or a metal hydroxide; and (C) a vulcanization accelerator comprising quaternary ammonium salt and/or quaternary phosphonium salt and not comprising a vulcanizing agent (see Patent Document 1).

When a vulcanizable acrylic rubber-fluororubber composition is used for automotive rubber components and the like, it is desired that compression set resistance is further improved.

PRIOR ART DOCUMENT

Patent Document

Patent Document 1: JP 3058555 B

SUMMARY OF THE INVENTION

Problem to be Solved by the Invention

An object of the present invention is to provide an acrylic rubber composition having further improved compression set resistance and a crosslinked product thereof.

Means to Solve the Problem

In the present invention, in order to further improve the above vulcanizable acrylic rubber-fluororubber composition, the inventors have found that an acrylic rubber composition where a crosslinkable group-containing acrylic rubber and a liquid fluororubber are included in a specific ratio and the crosslinked product thereof have, together with the properties of a conventional vulcanizable acrylic rubber-fluororubber composition, further improved compression set resistance and complete the invention. That is, the present invention is as follows.

The present invention is an acrylic rubber composition comprising, based on 100 parts by mass of (a1) an acrylic rubber obtained by copolymerizing 0.1 to 10% by mass of a crosslinkable group-containing monomer, (a2) 0.4 to 50.0% by mass of a liquid fluororubber.

It is preferable that the acrylic rubber comprises (meth)acrylate as the major component. Further, it is preferable that the amount of (meth)acrylate in the total amount of monomers constituting the acrylic rubber is 60 to 99.9% by mass.

A crosslinked product of the present invention is obtained by crosslinking the above acrylic rubber composition.

Effect of the Invention

According to the invention, an acrylic rubber composition where a crosslinkable group-containing acrylic rubber and a liquid fluororubber are included in a specific ratio and the crosslinked product thereof can have, with maintaining the properties of a conventional vulcanizable acrylic rubber-fluororubber composition, further improved compression set resistance.

BEST MODE FOR CARRYING OUT THE INVENTION

The acrylic rubber composition of the present invention comprises, based on 100 parts by mass of (a1) an acrylic rubber obtained by copolymerization of 0.1 to 10% by mass of a crosslinkable group-containing monomer, (a2) 0.4 to 50.0% by mass of a liquid fluororubber.

(Acrylic Rubber)

The acrylic rubber (a1) used in the present invention comprises a (meth)acrylate as the major component and comprises a crosslinkable group-containing monomer as a crosslinking component. It should be noted that in the specification, the term "(meth)acrylate" means both "methacrylate" and "acrylate".

Usable (meth)acrylates are not limited particularly, but it is preferable to use alkyl(meth)acrylates or alkoxyalkyl (meth)acrylates.

Examples of alkyl(meth)acrylates include, from the viewpoint of improving oil resistance, an alkyl(meth)acrylate having C1-8 alkyl group, and preferably, an alkyl(meth) acrylate having C2-4 alkyl group. Specific examples of the alkyl(meth)acrylate having C1-8 alkyl group include methyl (meth)acrylate, ethyl(meth)acrylate, propyl(meth)acrylate, isopropyl(meth)acrylate, n-butyl(meth)acrylate, isobutyl (meth)acrylate and octyl(meth)acrylate. These alkyl(meth) acrylates may be used alone, or may be used in combination with two or more thereof. Among them, it is particularly preferable to use ethyl(meth)acrylate and n-butyl(meth) acrylate since heat resistance, oil resistance and cold resistance can be obtained in a favorable balance.

Examples of alkoxyalkyl(meth)acrylates include, from the viewpoint of improving oil resistance, an alkoxyalkyl (meth)acrylate having C1-4 alkoxy group and C1-4 alkylene group. Examples of the alkoxyalkyl(meth)acrylate having C1-4 alkoxy group and C1-4 alkylene group include 2-methoxyethyl(meth)acrylate, 2-ethoxyethyl(meth)acrylate, 2-butoxyethyl(meth)acrylate and 2-methoxypropyl (meth)acrylate. These alkoxyalkyl(meth)acrylates may be used alone, or may be used in combination with two or more thereof. Among them, it is particularly preferable to use 2-methoxyethyl(meth)acrylate and 2-butoxyethyl(meth) acrylate since heat resistance, oil resistance and cold resistance can be obtained in a favorable balance.

The amount of (meth)acrylates in the monomer unit constituting the acrylic rubber (a1) is 60 to 99.9% by mass, preferably 70 to 99.9% by mass, more preferably 80 to 99.9% by mass. If the amount of the (meth)acrylates is within this range, the obtained acrylic rubber (a1) has good rubber elasticity and a satisfactory crosslinking density is obtained.

A crosslinkable group-containing monomer used for the acrylic rubber (a1) is a compound which is copolymerizable with a (meth)acrylate and crosslinks with a liquid fluororubber (a2) using the crosslinkable group. Examples of such crosslinkable group include a crosslinkable hydroxyl group and a crosslinkable halogen group. Since satisfactory crosslinking density can be obtained, a phenolic hydroxyl group is preferable as the crosslinkable hydroxyl group and a chlorine group is preferable as the crosslinkable halogen group.

Specific examples of the phenolic hydroxyl group containing monomer include o,m,p-hydroxystyrene, α-methylo-hydroxystyrene, o-chavicol, p,m-vinyl hydroxybenzoate, 4-hydroxybenzyl(meth)acrylate, vinyl salicylate, p-vinyl hydroxybenzoyloxy acetate, eugenol, isoeugenol, p-isopropenylphenol, o,m,p-allylphenol, 4-hydroxyphenyl(meth) acrylate, 2,2-(o,m,p-hydroxypenyl-4-vinylacetyl)propane. Specific examples of the chlorine group containing monomer include 2-chloroethyl vinyl ether, vinyl monochloroacetate, chloromethyl styrene and allyl chloride. These phenolic hydroxyl group containing monomers or chlorine group containing monomers may be used alone, or may be used in combination with two or more thereof.

The amount of the crosslinkable group-containing monomer in the monomer unit constituting the acrylic rubber (a1) is 0.1 to 10% by mass, preferably 0.3 to 8% by mass, more preferably 0.5 to 5% by mass. If the amount of the crosslinkable group-containing monomer is less than 0.1% by mass, required rubber elasticity is not obtained and is not preferable. On the other hand, if the amount of the crosslinkable group-containing monomer is more than 10% by mass, appropriate rubber elasticity is not obtained and is not preferable either.

In the present invention, to the monomer constituting the acrylic rubber (a1) can be added monomers which are copolymerize with (meth)acrylates. These monomers are used for improving various performances of the acrylic rubber (a1) to be obtained. Specific examples of the monomers which are copolymerize with (meth)acrylates include: acrylates of aromatic, alicyclic and aliphatic alcohol group such as styrene, vinyltoluene, vinylpyridine, α-methylstyrene, ethylene, propylene, acrylonitrile, methacrylonitrile, acrylamide, N-methylolacrylamide, vinyl acetate, vinyl chloride, cyclohexyl acrylate and benzyl acrylate; and esters of unsaturated carboxylic acid such as methacrylic acid, itaconic acid, fumaric acid and maleic acid, and lower alcohol. These monomers which are copolymerize with (meth)acrylates may be used alone, or may be used in combination with two or more thereof.

Monomers which are copolymerize with (meth)acrylates are not limited particularly as long as the effect of the invention is not impaired. Specific amount of the monomers which are copolymerize with (meth)acrylates in the monomer unit constituting the acrylic rubber (a1) may be 30% by mass or less, and preferably 20% by mass or less.

The acrylic rubber (a1) to be used in the present invention is not limited particularly and can be produced by a known method. For example, the acrylic rubber (a1) can be produced by the following method. To a beaker of 2 L is added 1250 g of deionized water into which 5.0 g of dioctyl sulfosuccinate sodium salt as an anionic emulsifier is dissolved. To the mixture is added monomer mixtures constituting the acrylic rubber (a1) in the total amount of 300 g, followed by emulsification using a small mixer. Then the monomer emulsified liquid is put into a polymerization container of 2 L with a reflex condenser tube and the temperature is elevated to 70° C. under nitrogen stream. To this liquid is added 10 g of 10% ammonium persulfate solution and polymerization is initiated. After polymerization initiation, the temperature in the polymerization container is increased from the initial temperature, i.e. 70° C. to 80° C. The temperature is maintained in the range of 80 to 82° C. for two hours to complete the polymerization reaction. The obtained latex is subjected to polymer coagulation by a normal salting-out process using common salt as a salting-out agent. Then the latex is rinsed in water and dried to obtain the acrylic rubber (a1).

The liquid fluororubber (a2) used in the present invention is a fluororubber which is in the form of liquid at normal temperature (20° C.) and examples thereof include a copolymer of vinylidene fluoride and hexafluoropropyrene, a terpolymer of vinylidene fluoride, hexafluoropentene and tetrafluoroethylene, perfluoropropene oxide polymer, and a copolymer of tetrafluoroethylene, propylene and vinylidene fluoride. Commercially available Viton (registered trademark) LM (manufactured by DuPont), DAI-EL (registered trademark) G-101 (manufactured by DAIKIN INDUSTRIES, LTD.), Dyneon FC2210 (manufactured by 3M Company) and the like can be used as these liquid fluororubbers.

The viscosity of the liquid fluororubber (a2) is not limited particularly, but since kneading performance, fluidity and crosslinking reactivity are good and moldability is excellent, it is preferable if the viscosity at 105° C. is about 500 to 30000 cps, preferably about 550 to 25000 cps.

The compounded amount of the acrylic rubber (a1) and the liquid fluororubber (a2) is such that based on 100 parts by mass of the acrylic rubber (a1), the amount of the liquid fluororubber (a2) is 0.4 to 50.0 parts by mass, preferably 0.5 to 40 parts by mass, more preferably 1.0 to 20 parts by mass. If the compounded amount of the liquid fluororubber (a2) is within this range, more appropriate vulcanization rate can be obtained.

The acrylic rubber composition and the crosslinked product thereof of the present invention may comprise an acid acceptor and a vulcanization accelerator. By the use of an acid acceptor and a vulcanization accelerator, the acrylic rubber (a1) can be directly vulcanized with the liquid fluororubber (a2) without using a vulcanizing agent. While the acrylic rubber composition and the crosslinked product thereof of the present invention may comprise a known vulcanizing agent, it is preferable not to comprise a vulcanizing agent.

Examples of the acid acceptor include a metal oxide and a metal hydroxide. Examples of the metal oxide include magnesium oxide, zinc oxide, calcium oxide and the like. Examples of the metal hydroxide include magnesium hydroxide, zinc hydroxide, calcium hydroxide, aluminum hydroxide, hydrotalcite, basic silica and the like. These acid acceptors may be used alone, or may be used in combination with two or more thereof.

The amount of the acid acceptors may be 0.5 to 20 parts by mass based on 100 parts by mass of the rubber component. If the amount of the acid acceptors is less than the above range, a satisfactory acid accepting effect and vulcanization rate cannot be obtained, and if the amount of the acid acceptors is more than the above range, scorch stability and storage stability are impaired and thus is not preferable.

Examples of the vulcanization accelerator include quaternary ammonium salt and quaternary phosphonium salt. Examples of quaternary ammonium salt include tetraethyl ammonium chloride, tetraethyl ammonium bromide, tetrabutyl ammonium chloride, tetrabutyl ammonium bromide, n-dodecyltrimethyl ammonium chloride, n-dodecyltrimethyl ammonium bromide, octadecyltrimethyl ammonium bromide, cetyldimethylammonium chloride, 1,6-diaza-bicyclo(5.4.0)undecene-7-cetyl pyridium sulfate, trimethylbenzylammonium benzoate and the like. Examples of quaternary phosphonium salt include triphenyl benzyl phosphonium chloride, triphenyl benzyl phosphonium bromide, tricyclohexylbenzyl phosphonium chloride, tricyclohexylbenzyl phosphonium bromide and the like. These vulcanization accelerators may be used alone, or may be used in combination with two or more thereof.

The amount of the vulcanization accelerators may be 0.5 to 5 parts by mass based on 100 parts by mass of the rubber component. If the amount of the vulcanization accelerators is less than the above range, a satisfactory vulcanization rate cannot be obtained, and if the amount is more than the above range, scorch stability and storage stability are impaired and thus is not preferable.

In addition to the rubber component (A) comprising the acrylic rubber (a1) and the liquid fluororubber (a2), the above acid acceptors and vulcanization accelerators, the acrylic rubber composition and the crosslinked product thereof of the present invention may further comprise auxiliary materials which are added in a general rubber material depending on purposes. Examples of such auxiliary materials include an antioxidant, a lubricant, a filler, a plasticizer, a stabilizer, a pigment and the like. Specific examples of the auxiliary materials are shown below, but auxiliary materials are not limited thereto.

Examples of an antioxidant include a diphenylamine derivative, a phenylenediamine derivative and the like. Examples of a lubricant include a stearic acid, paraffin wax and the like. Further, examples of a filler include carbon black, silica, kaolin clay, talc, diatomaceous earth and the like, and examples of a plasticizer include a phthalate derivative, an adipic acid derivative, a polyether ester derivative and the like. Examples of a stabilizer include phthalic anhydride, benzoic acid, N-(cyclohexylthio)phthalimide, a sulfonamide derivative and the like. Examples of a pigment include titanium oxide, carbon black, Cyanine blue and the like.

A preparation method of the acrylic rubber composition and the crosslinked product thereof of the present invention is not limited particularly, and a known preparation method can be used. For example, an unvulcanized rubber can be prepared by kneading each compounded component with an open roll or an internal mixer which is usually used in rubber industry. The obtained unvulcanized rubber composition is vulcanized using a vulcanizing machine usually used in rubber industry such as hot pressing, an injection molding machine and a steam can to obtain a rubber.

The acrylic rubber composition and the crosslinked product thereof of the present invention has, when compared to a conventional acrylic rubber composition and the crosslinked product thereof, further improved compression set resistance, and therefore, can be more preferably used for automotive rubber components such as gaskets, hoses, O-rings, seals.

EXAMPLE

In the following, the present invention will be explained based on Examples, but the present invention is not limited thereto. It should be noted that unless otherwise noted, "parts" are by mass and "%" is by mass.

In Examples and Comparative Examples, the following materials were used.

(Acrylic Rubber)
Acrylic rubber 1: copolymer consisted of 48% by mass of ethyl acrylate, 25% by mass of butyl acrylate, 25% by mass of 2-methoxyethyl acrylate and 2% by mass of p-hydroxystyrene
Acrylic rubber 2 (active halogen-containing acrylic rubber): copolymer consisted of 48% by mass of ethyl acrylate, 25% by mass of butyl acrylate, 25% by mass of 2-methoxyethyl acrylate and 2% by mass of vinyl monochloroacetate
Acrylic rubber 3 (epoxy acrylic rubber): copolymer consisted of 48% by mass of ethyl acrylate, 25% by mass of butyl acrylate, 25% by mass of 2-methoxyethyl acrylate and 2% by mass of allylglycidylether
(Liquid Fluororubber)
DAI-EL G101: binary copolymer of vinylidene fluoride and hexafluoropropyrene (manufactured by DAIKIN INDUSTRIES, LTD.)
(Fluororubber 1)
DAI-EL 701: binary copolymer of vinylidene fluoride and hexafluoropropyrene (manufactured by DAIKIN INDUSTRIES, LTD.)
(Fluororubber 2)
DAI-EL G501NK: terpolymer of vinylidene fluoride, tetrafluoroethylene and hexafluoropropyrene (manufactured by DAIKIN INDUSTRIES, LTD.)

(Fluororubber 3)
Tecnoflon NMLB: terpolymer of vinylidene fluoride and hexafluoropropyrene (manufactured by Slovay Solexis, Inc.)
(Lubricant 1)
Hi-Mic #1070: microcrystalline wax (manufactured by NIPPON SEIRO CO., LTD.)
(Lubricant 2)
Stearic Acid Sakura: stearic acid (manufactured by Kao Corporation)
(Antioxidant)
Naugard #445: diphenyl amine derivative (manufactured by Uniroyal Co., Ltd.)
(Filler)
Seast SO: FEF carbon black (manufactured by Tokai Carbon co., ltd.)
(Acid Acceptor 1)
Caldic 2000: calcium hydrate (manufactured by Ohmi Chemical Industry Co., Ltd.)
(Acid Acceptor 2)
Kyowa Mag 150: magnesium oxide (manufactured by Kyowa Chemical Industrial Co., Ltd.)
(Acid Acceptor 3)
DHT-4A-2: hydrotalcite (manufactured by Kyowa Chemical Industry Co., Ltd)
(Vulcanization Accelerator 1)
VULNOC OB: octadecyl trimethyl ammonium bromide (manufactured by Ouchi Shinko Chemical Industrial Co., Ltd.)
(Vulcanization Accelerator 2)
TBAB: tetrabutylammonium bromide (manufactured by LION AKZO Co., Ltd.)
(Vulcanization Accelerator 3)
BTPPCL: benzyl triphenyl phosphonium chloride (manufactured by Rohm and Haas Co., Ltd.)

Nonsoul SN-1: sodium stearate (manufactured by NOF CORPORATION)
Nonsoul SK-1: potassium stearate (manufactured by NOF CORPORATION)
Fine powder sulfur (manufactured by Tsurumi Chemical Industry Co., Ltd.)
NOCCELER TTFE: ferric dimethyl dithiocarbamate (manufactured by Ouchi Shinko Chemical Industrial Co., Ltd.)
NOCCELER PZ: zinc dimethyl dithiocarbamate (manufactured by Ouchi Shinko Chemical Industrial Co., Ltd.)

Example 1

To a beaker of 2 L was added 1250 g of deionized water into which 5.0 g of dioctyl sulfosuccinate sodium salt as an anionic emulsifier was dissolved. To the mixture were added 144 g of ethyl acrylate, 75 g of butyl acrylate, 75 g of 2-methoxyethyl acrylate and 6 g of p-hydroxystyrene, followed by emulsification using a small mixer. Then the monomer emulsified liquid was put into a polymerization container of 2 L with a reflex condenser tube and the temperature was elevated to 70° C. under nitrogen stream. To this liquid was added 10 g of 10% ammonium persulfate solution and polymerization was initiated. After polymerization initiation, the temperature in the polymerization container was increased from the initial temperature, i.e. 70° C. to 80° C. The temperature was maintained in the range of 80 to 82° C. for two hours to complete the polymerization reaction. The obtained latex was subjected to polymer coagulation using common salt as a salting-out agent. Then the latex was rinsed in water and dried to obtain the acrylic rubber 1.

100 Parts of the obtained acrylic rubber 1, 0.4 part of the liquid fluororubber (DAI-EL G101), 50 parts of the filler (Seast SO), 1 part of the lubricant 1 (Stearic Acid Sakura), 1 part of the lubricant 2 (Hi-Mic #1070), 2 parts of the antioxidant (Naugard #445), 4 parts of the acid acceptor 1 (Caldic 2000), 2 parts of the acid acceptor 2 (Kyowa Mag 150) and 2 parts of the vulcanization accelerator 1 (VULNOC OB) were kneaded with an open roll to prepare a rubber composition.

Examples 2 to 9 and Comparative Examples 1 to 4

According to the compounding formula shown in Table 1, rubber compositions were prepared in the same manner as Example 1. The unit of each is parts by mass.

TABLE 1

| Component (part) | Com. Ex. 1 | Ex. 1 | Ex. 2 | Ex. 3 | Ex. 4 | Ex. 5 | Ex. 6 | Ex. 7 | Ex. 8 | Ex. 9 | Com. Ex. 2 | Com. Ex. 3 | Com. Ex. 4 |
|---|---|---|---|---|---|---|---|---|---|---|---|---|---|
| Acrylic rubber 1 | 100.0 | 100.0 | 100.0 | 100.0 | 100.0 | 100.0 | 100.0 | 100.0 | 100.0 | 100.0 | 100.0 | 100.0 | 100.0 |
| Liquid fluororubber | 0.3 | 0.4 | 0.5 | 1.0 | 2.0 | 4.0 | 10.0 | 20.0 | 40.0 | 50.0 | 60.0 | 70.0 | 100.0 |
| Lubricant 1 | 1.0 | 1.0 | 1.0 | 1.0 | 1.0 | 1.0 | 1.0 | 1.0 | 1.0 | 1.0 | 1.0 | 1.0 | 1.0 |
| Lubricant 2 | 1.0 | 1.0 | 1.0 | 1.0 | 1.0 | 1.0 | 1.0 | 1.0 | 1.0 | 1.0 | 1.0 | 1.0 | 1.0 |
| Antioxidant | 2.0 | 2.0 | 2.0 | 2.0 | 2.0 | 2.0 | 2.0 | 2.0 | 2.0 | 2.0 | 2.0 | 2.0 | 2.0 |
| Filler | 50.0 | 50.0 | 50.0 | 50.0 | 50.0 | 50.0 | 50.0 | 50.0 | 50.0 | 50.0 | 50.0 | 50.0 | 50.0 |
| Acid acceptor 1 | 4.0 | 4.0 | 4.0 | 4.0 | 4.0 | 4.0 | 4.0 | 4.0 | 4.0 | 4.0 | 4.0 | 4.0 | 4.0 |
| Acid acceptor 2 | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator 1 | 2.0 | 2.0 | 2.0 | 2.0 | 2.0 | 2.0 | 2.0 | 2.0 | 2.0 | 2.0 | 2.0 | 2.0 | 2.0 |

(Physical Property of Vulcanizate)

Each of the obtained rubber compositions was subjected to a primary vulcanization (vulcanization condition: 180° C., 15 minutes) and a secondary vulcanization (vulcanization condition: 180° C., 24 hours) using hot pressing. Hardness, tensile property, air heat aging and compression set of the obtained vulcanizates were measured. Here, the hardness (JIS K6253: 2006 Type A) was measured using a pocket durometer (manufactured by Akashi Corporation). The tensile strength was measured with Strograph AE (manufactured by Toyo Seiki Seisaku-sho, Ltd.) according to JIS K6251: 2004. The air heat aging was measured under a test condition of 175° C., 72 hours according to JIS K6257: 2010. The compression set was measured under a test condition of 150° C., 72 hours according to JIS K6262: 2006. The results are shown in Table 2.

TABLE 2

| Physical property of vulcanizate | Com. Ex. 1 | Ex. 1 | Ex. 2 | Ex. 3 | Ex. 4 | Ex. 5 | Ex. 6 | Ex. 7 | Ex. 8 | Ex. 9 | Com. Ex. 2 | Com. Ex. 3 | Com. Ex. 4 |
|---|---|---|---|---|---|---|---|---|---|---|---|---|---|
| Properties in ordinary state | | | | | | | | | | | | | |
| Hardness HS (Duro-A) | 64 | 65 | 65 | 67 | 69 | 72 | 72 | 65 | 59 | 54 | 46 | Defective molding (insufficient vulcanization) | Defective molding (insufficient vulcanization) |
| Tensile strength TB (MPa) | 11.7 | 11.7 | 11.8 | 12.6 | 12.5 | 11.9 | 10.9 | 10.1 | 9.2 | 8.6 | 6.5 | | |
| Elongation EB (%) | 300 | 280 | 270 | 200 | 140 | 100 | 90 | 170 | 260 | 370 | 490 | | |
| Air heat aging | | | | | | | | | | | | | |
| Hardness change ΔHS (pts) | +6 | +5 | +4 | +4 | +3 | +3 | +1 | +3 | +3 | +4 | +10 | | |
| Compression set C.S. (%) | 51.9 | 48.8 | 46.4 | 36.8 | 25.4 | 16.3 | 14.7 | 19.3 | 32.5 | 48.4 | 59.1 | | |

From Table 2, it can be seen that if the amount of the liquid fluororubber is 0.4 to 50.0 parts by mass based on 100 parts by mass of the acrylic rubber the hardness change due to air heat aging is small and compression set is also small. Also, it can be seen from Comparative Examples 3 and 4 that if the amount of the liquid fluororubber is excess, the vulcanizates cannot be vulcanized enough and thus cannot be molded.

Examples 10 to 16

Experimental Results Regarding Type and Added Amount of Acid Acceptor

According to the compounding formula shown in Table 3, rubber compositions were prepared in the same manner as Example 1 except that the type and the added amount of the acid acceptor and vulcanization accelerator were changed. The unit of each is parts by mass. The test results of the obtained rubber compositions are shown in Table 4.

TABLE 3

| Component (part) | 10 | 11 | 5 | 12 | 13 | 14 | 15 | 16 |
|---|---|---|---|---|---|---|---|---|
| Acrylic rubber 1 | 100.0 | 100.0 | 100.0 | 100.0 | 100.0 | 100.0 | 100.0 | 100.0 |
| Liquid fluororubber | 4.0 | 4.0 | 4.0 | 4.0 | 4.0 | 4.0 | 4.0 | 4.0 |
| Lubricant 1 | 1.0 | 1.0 | 1.0 | 1.0 | 1.0 | 1.0 | 1.0 | 1.0 |
| Lubricant 2 | 1.0 | 1.0 | 1.0 | 1.0 | 1.0 | 1.0 | 1.0 | 1.0 |
| Antioxidant | 2.0 | 2.0 | 2.0 | 2.0 | 2.0 | 2.0 | 2.0 | 2.0 |
| Filler | 50.0 | 50.0 | 50.0 | 50.0 | 50.0 | 50.0 | 50.0 | 50.0 |
| Acid acceptor 1 | 1.0 | 2.0 | 4.0 | 6.0 | 4.0 | 4.0 | 4.0 | |
| Acid acceptor 2 | 2.0 | 2.0 | 2.0 | 2.0 | 4.0 | 6.0 | | |
| Acid acceptor 3 | | | | | | | | 4.0 |
| Vulcanization accelerator 1 | 2.0 | 2.0 | 2.0 | 2.0 | 2.0 | 2.0 | 2.0 | 2.0 |
| Vulcanization accelerator 2 | | | | | | | | |
| Vulcanization accelerator 3 | | | | | | | | |

TABLE 4

| Physical property of vulcanizate | 10 | 11 | 5 | 12 | 13 | 14 | 15 | 16 |
|---|---|---|---|---|---|---|---|---|
| Properties in ordinary state | | | | | | | | |
| Hardness HS (Duro-A) | 69 | 70 | 72 | 76 | 73 | 75 | 72 | 64 |
| Tensile strength TB (MPa) | 11.4 | 11.0 | 11.9 | 11.9 | 11.5 | 11.6 | 11.2 | 11.3 |
| Elongation EB (%) | 120 | 110 | 100 | 100 | 110 | 110 | 120 | 210 |
| Air heat aging | | | | | | | | |
| Hardness change ΔHS (pts) | +3 | +3 | +3 | +2 | +3 | +3 | +3 | +0 |
| Compression set C.S. (%) | 16.9 | 17.5 | 16.3 | 15.8 | 16.7 | 16.2 | 15.8 | 14.7 |

From Table 4, it can be seen that even if the type or added amount of the acid acceptor is changed, the hardness change due to air heat aging is small and compression set is also small unless departing from the range described in the specification of the present invention.

Examples 17 to 21

Experimental Results Regarding Type and Added Amount of Vulcanization Accelerator According to the compounding formula shown in Table 5, rubber compositions were prepared in the same manner as Example 1 except that the type and the added amount of the vulcanization accelerator were changed. The unit of each is parts by mass. The test results of the obtained rubber compositions are shown in Table 6.

TABLE 5

| Component (part) | Example 5 | 17 | 18 | 19 | 20 | 21 |
|---|---|---|---|---|---|---|
| Acrylic rubber 1 | 100.0 | 100.0 | 100.0 | 100.0 | 100.0 | 100.0 |

TABLE 5-continued

| Component | Example | | | | | |
|---|---|---|---|---|---|---|
| (part) | 5 | 17 | 18 | 19 | 20 | 21 |
| Liquid fluororubber | 4.0 | 4.0 | 4.0 | 4.0 | 4.0 | 4.0 |
| Lubricant 1 | 1.0 | 1.0 | 1.0 | 1.0 | 1.0 | 1.0 |
| Lubricant 2 | 1.0 | 1.0 | 1.0 | 1.0 | 1.0 | 1.0 |
| Antioxidant | 2.0 | 2.0 | 2.0 | 2.0 | 2.0 | 2.0 |
| Filler | 50.0 | 50.0 | 50.0 | 50.0 | 50.0 | 50.0 |
| Acid acceptor 1 | 4.0 | 4.0 | 4.0 | 4.0 | 4.0 | 4.0 |
| Acid acceptor 2 | 2.0 | 2.0 | 2.0 | 2.0 | 2.0 | 2.0 |
| Acid acceptor 3 | | | | | | |
| Vulcanization accelerator 1 | 2.0 | 1.0 | 3.0 | 4.0 | | |
| Vulcanization accelerator 2 | | | | | 2.0 | |
| Vulcanization accelerator 3 | | | | | | 2.0 |

TABLE 6

| Physical property of | Example | | | | | |
|---|---|---|---|---|---|---|
| vulcanizate | 5 | 17 | 18 | 19 | 20 | 21 |
| Properties in ordinary state | | | | | | |
| Hardness HS (Duro-A) | 72 | 72 | 73 | 73 | 73 | 73 |
| Tensile strength TB (MPa) | 11.9 | 10.9 | 11.5 | 11.4 | 9.4 | 9.0 |
| Elongation EB (%) | 100 | 120 | 110 | 100 | 100 | 90 |
| Air heat aging | | | | | | |
| Hardness change ΔHS (pts) | +3 | +2 | +3 | +1 | +3 | +1 |
| Compression set C.S. (%) | 16.3 | 16.6 | 17.5 | 18.3 | 14.8 | 16.6 |

From Table 6, it can be seen that even if the type or added amount of the vulcanization accelerator is changed, the hardness change due to air heat aging is small and compression set is also small unless departing from the range described in the specification of the present invention.

Comparative Examples 5 to 9

Experimental Results Regarding Type of Fluororubber

According to the compounding formula shown in Table 7, rubber compositions were prepared in the same manner as Example 5 except that among the components in Example 5, a fluororubber which is not in the liquid state or an acrylic rubber of a different type was used. The unit of each is parts by mass. The test results of the obtained rubber compositions are shown in Table 8.

Comparative Example 8

The acrylic rubber 2 was obtained by the same operation as the production of the acrylic rubber 1 described in Example 1 except that p-hydroxystyrene was changed to vinyl monochloroacetate.

Comparative Example 9

The acrylic rubber 3 was obtained by the same operation as the production of the acrylic rubber 1 described in Example 1 except that p-hydroxystyrene was changed to allylglycidylether.

The obtained acrylic rubbers 2 and 3 were kneaded by the same operation as is described in Example 1 according to each compounded amount shown in Table 7 to obtain rubber compositions, respectively.

Each of the obtained rubber compositions were subjected to a primary vulcanization (vulcanization condition: 180° C., 15 minutes) and a secondary vulcanization (vulcanization condition: 180° C., 4 hours) using hot pressing to prepare vulvanizates. Similar to as is described in Example 1, hardness, tensile property, air heat aging and compression set of the obtained vulcanizates were measured.

TABLE 7

| Component | Ex. | Com. Ex. | | | | |
|---|---|---|---|---|---|---|
| (part) | 5 | 5 | 6 | 7 | 8 | 9 |
| Acrylic rubber 1 | 100.0 | 100.0 | 100.0 | 100.0 | | |
| Acrylic rubber 2 (active halogen-containing acrylic rubber) | | | | | 100.0 | |
| Acrylic rubber 3 (epoxy acrylic rubber) | | | | | | 100.0 |
| Liquid fluororubber | 4.0 | | | | | |
| Fluororubber 1 | | 4.0 | | | | |
| Fluororubber 2 | | | 4.0 | | | |
| Fluororubber 3 | | | | 4.0 | | |
| Lubricant 1 | 1.0 | 1.0 | 1.0 | 1.0 | 1.0 | 1.0 |
| Lubricant 2 | 1.0 | 1.0 | 1.0 | 1.0 | 1.0 | 1.0 |
| Antioxidant | 2.0 | 2.0 | 2.0 | 2.0 | 2.0 | 2.0 |
| Filler | 50.0 | 50.0 | 50.0 | 50.0 | 50.0 | 50.0 |
| Acid acceptor 1 | 4.0 | 4.0 | 4.0 | 4.0 | | |
| Acid acceptor 2 | 2.0 | 2.0 | 2.0 | 2.0 | | |
| Vulcanization accelerator 1 | 2.0 | 2.0 | 2.0 | 2.0 | | |
| Nonsoul SN-1 | | | | | 2.5 | |
| Nonsoul SK-1 | | | | | 0.3 | |
| Fine powder sulfur | | | | | 0.3 | |
| NOCCELER TTFE | | | | | 0.5 | |
| NOCCELER PZ | | | | | 1.0 | |

TABLE 8

| Physical property of | Ex. | Com. Ex. | | | | |
|---|---|---|---|---|---|---|
| vulcanizate | 5 | 5 | 6 | 7 | 8 | 9 |
| Properties in ordinary state | | | | | | |
| Hardness HS (Duro-A) | 72 | 63 | 62 | 62 | 55 | 69 |
| Tensile strength TB (MPa) | 11.9 | 11 | 10.9 | 11.2 | 12.9 | 11.7 |
| Elongation EB (%) | 100 | 310 | 350 | 290 | 260 | 270 |
| Air heat aging | | | | | | |
| Hardness change ΔHS (pts) | +3 | +4 | +4 | +4 | +5 | +8 |
| Compression set C.S. (%) | 16.3 | 32.2 | 38.7 | 30.5 | 52.2 | 59.0 |

From Table 8, it can be seen from Example 5 and Comparative Examples 8 and 9 that when the acrylic rubber comprising a (meth)acrylate as the major component and being obtained by copolymerizing a crosslinkable group-containing monomer is used, it is possible to decrease a hardness change due to air heat aging and compression set. Also, from Table 8, it can be seen from Example 5 and Comparative Examples 5 and 6 that when the liquid fluororubber is used, it is possible to decrease a hardness change due to air heat aging and compression set.

INDUSTRIAL AVAILABILITY

The acrylic rubber composition and the crosslinked product thereof according to the present invention are excellent in compression set resistance. As a result of which, they can be suitably used for automotive rubber components such as gaskets, hoses, O-rings, seals where heat resistance and/or oil resistance is required. Additionally, they can be widely used as a rubber material such as a coating material, a wide variety of belts and a roll.

The invention claimed is:

1. An acrylic rubber composition comprising, a rubber component consisting of (a1) an acrylic rubber, and (a2) 0.4 to 50.0 parts by mass of a liquid fluororubber, wherein the parts by mass of (a2) is based on 100 parts by mass of (a1); and wherein, the acrylic rubber is obtained by copolymerizing monomers comprised of a (meth)acrylate and a monomer with a cross-linkable group, wherein 0.1 to 10% by mass of the monomers are the monomer with a cross-linkable group.

2. The acrylic rubber composition of claim 1, wherein the amount of monomers of the (meth)acrylate in the total monomers constituting the acrylic rubber is 60 to 99.9% by mass.

3. A crosslinked product obtained by crosslinking the cross-linkable group of the acrylic rubber in the acrylic rubber composition of claim 1.

4. A crosslinked product obtained by crosslinking the cross-linkable group of the acrylic rubber in the acrylic rubber composition of claim 2.

5. The acrylic rubber composition of claim 1, wherein the monomers consist of the (meth)acrylate and the monomer with a cross-linkable group, wherein 0.1 to 10% by mass of the monomers are the monomer with a cross-linkable group.

6. A crosslinked product obtained by crosslinking the cross-linkable group of the acrylic rubber in the acrylic rubber composition of claim 5.

* * * * *